United States Patent
Henry et al.

(10) Patent No.: US 8,316,243 B2
(45) Date of Patent: Nov. 20, 2012

(54) APPARATUS AND METHOD FOR GENERATING UNPREDICTABLE PROCESSOR-UNIQUE SERIAL NUMBER FOR USE AS AN ENCRYPTION KEY

(75) Inventors: G. Glenn Henry, Austin, TX (US); Terry Parks, Austin, TX (US)

(73) Assignee: VIA Technologies, Inc., New Taipei (TW)

( * ) Notice: Subject to any disclaimer, the term of this patent is extended or adjusted under 35 U.S.C. 154(b) by 329 days.

(21) Appl. No.: 12/781,124

(22) Filed: May 17, 2010

(65) Prior Publication Data

US 2011/0035599 A1 Feb. 10, 2011

Related U.S. Application Data

(60) Provisional application No. 61/232,236, filed on Aug. 7, 2009.

(51) Int. Cl.
*G06F 21/00* (2006.01)
(52) U.S. Cl. ............................ 713/189; 713/193; 726/26
(58) Field of Classification Search .................. 713/189
See application file for complete search history.

(56) References Cited

U.S. PATENT DOCUMENTS

| | | | |
|---|---|---|---|
| 5,774,544 A | 6/1998 | Lee et al. | |
| 5,790,663 A | 8/1998 | Lee et al. | |
| 5,790,783 A | 8/1998 | Lee et al. | |
| 6,154,818 A | 11/2000 | Christie | |
| 6,704,872 B1 * | 3/2004 | Okada | 713/194 |
| 7,043,616 B1 | 5/2006 | McGrath | |
| 7,366,849 B2 | 4/2008 | Poisner | |
| 7,366,911 B2 | 4/2008 | Garay et al. | |
| 8,130,959 B2 | 3/2012 | Goodman et al. | |
| 2003/0101322 A1 | 5/2003 | Gardner | |
| 2003/0196096 A1 | 10/2003 | Sutton | |
| 2004/0139346 A1 | 7/2004 | Watt et al. | |
| 2004/0190558 A1 * | 9/2004 | Oliver | 370/503 |
| 2007/0006213 A1 | 1/2007 | Shahidzadeh et al. | |
| 2007/0098152 A1 * | 5/2007 | Detrick et al. | 380/30 |
| 2008/0163383 A1 * | 7/2008 | Kumar et al. | 726/29 |
| 2009/0096481 A1 * | 4/2009 | Butter | 326/38 |
| 2010/0235645 A1 | 9/2010 | Henry et al. | |

OTHER PUBLICATIONS

"Live Migration with AMD-V™ Extended Migration Technology." AMD White Paper. pp. 1-8. Downloaded from http://developer.amd.com/assets/Live%20Virtual%20Machine%20Migration%20on%20AMD%20processors.pdf. Downloaded on Sep. 5, 2008.

* cited by examiner

*Primary Examiner* — Kim Vu
*Assistant Examiner* — Yogesh Paliwal
(74) *Attorney, Agent, or Firm* — E. Alan Davis; James W. Huffman

(57) ABSTRACT

A microprocessor includes a manufacturing ID that is stored in the microprocessor during manufacture thereof in a non-volatile manner. The manufacturing ID is unique to the microprocessor. The microprocessor also includes a secret encryption key that is stored internally within the microprocessor and unreadable externally from the microprocessor. The microprocessor also includes an AES encryption engine, coupled to receive the manufacturing ID and the secret encryption key, configured to encrypt the manufacturing ID using the secret encryption key to generate an unpredictable key that is unique to the microprocessor.

19 Claims, 2 Drawing Sheets

APPARATUS AND METHOD FOR GENERATING UNPREDICTABLE PROCESSOR-UNIQUE SERIAL NUMBER FOR USE AS AN ENCRYPTION KEY

CROSS REFERENCE TO RELATED APPLICATION(S)

This application claims priority based on U.S. Provisional Application Ser. No. 61/232,236, filed Aug. 7, 2009, entitled APPARATUS AND METHOD FOR LIMITING ACCESS TO MODEL SPECIFIC REGISTERS IN A MICROPROCESSOR, which is hereby incorporated by reference in its entirety.

This application is related to U.S. Non-Provisional Application, Ser. No. 12/781,087, filed concurrently herewith, entitled APPARATUS AND METHOD FOR LIMITING ACCESS TO MODEL SPECIFIC REGISTERS IN A MICROPROCESSOR, which is hereby incorporated by reference in its entirety.

FIELD OF THE INVENTION

The present invention relates in general to encryption, and particularly to the generation of unique encryption keys.

BACKGROUND OF THE INVENTION

There are security contexts in which a number or key that is unique to a particular microprocessor part is needed. One solution has been to manufacture a unique serial number into each part. However, serial numbers are very predictable since they are structured and repetitive. This high predictability is not good in many security contexts.

U.S. Pat. Nos. 5,790,783, 5,790,663, and 5,774,544 to Lee, et al. describe a method and apparatus for encrypting and decrypting a microprocessor serial number. Lee, et al. teaches an integrated circuit package that includes a CPU die and an NVRAM die that are coupled together by a serial interface. The manufacturer populates an MSR with the desired serial number for the CPU and populates two other MSRs with two different keys. The CPU subsequently encrypts the serial number using the first key, and then encrypts the encrypted serial number and first key with the second key according to an encryption algorithm. The CPU then writes the double-encrypted serial number to the NVRAM including a CRC value.

Additionally, Lee, et al. teaches that the manufacturer populates an MSR with the second key. The CPU subsequently reads the double-encrypted serial number from the NVRAM (checking the CRC value), decrypts it using the second key to obtain the singly-encrypted serial number and first key, decrypts the singly-encrypted serial number using the decrypted first key to obtain the decrypted serial number, and stores the decrypted serial number in an MSR. The writing of the serial number to NVRAM and the reading of the serial number from the NVRAM can only be performed when the processor is unlocked, which occurs when the processor detects that the NVRAM is zeroed out or when the manufacturer populates MSRs with the current processor serial number and the two keys that were used to create the serial number and the serial numbers match.

Lee, et al. further teaches an API that allows serialized software (i.e., software that is linked to a processor's serial number such that the software will not be able to run on a processor with another serial number, such as when a processor is upgraded) to read the CPU serial number from the NVRAM by populating an MSR with the second key. The second key is also stored in system CMOS. The API also provides a function that allows serialized software to read the CPU serial number that was most recently stored by the system (presumably in CMOS or on disk). If the two values match, the serialized software may continue to run. Otherwise, the serialized software assumes the user upgraded the CPU to a new CPU with a new serial number and calls another API function that requests authorization to run on the new CPU. If authorization is permitted, then the serialized software performs a software lock using the new CPU serial number. Otherwise, the serialized software does not run, or else runs in a limited capacity.

The method of Lee, et al. has some deficiencies. First, although Lee, et al. states the two encryption keys and the encryption algorithm are only known by the manufacturer (col. 4, lines 24-26), he acknowledges that a potential gap in his method is that the two keys are stored in MSRs (col. 6, lines 30-32), which can be read by users. Furthermore, the second key is stored in system CMOS. Thus, Lee, et al. concludes: "While the above system and method does not provide complete protection against unauthorized access to the key or serial number, the casual user will not be able to gain unauthorized access." Although Lee, et al. uses two separate encryption keys, they are only 32-bits each, which are not very secure for many applications. Finally, only one of the two encryption keys is needed to read the serial number.

BRIEF SUMMARY OF INVENTION

In one aspect the present invention provides a microprocessor. The microprocessor includes a manufacturing ID that is stored in the microprocessor during manufacture thereof in a non-volatile manner. The manufacturing ID is unique to the microprocessor. The microprocessor also includes a secret encryption key that is stored internally within the microprocessor and unreadable externally from the microprocessor. The microprocessor also includes an AES encryption engine, coupled to receive the manufacturing ID and the secret encryption key, configured to encrypt the manufacturing ID using the secret encryption key to generate an unpredictable key that is unique to the microprocessor.

In another aspect, the present invention provides a method. The method includes storing a manufacturing ID in a microprocessor during manufacture thereof in a non-volatile manner. The manufacturing ID is unique to the microprocessor. The method also includes storing a secret encryption key internally within the microprocessor in a manner unreadable externally from the microprocessor. The method also includes encrypting the manufacturing ID using the secret encryption key to generate an unpredictable key that is unique to the microprocessor. The encrypting is performed by an AES encryption engine of the microprocessor.

In yet another aspect, the present invention provides a computer program product for use with a computing device, the computer program product comprising a computer usable storage medium, having computer readable program code embodied in the medium for specifying a microprocessor. The computer readable program code includes first program code for specifying a manufacturing ID that is stored in the microprocessor during manufacture thereof in a non-volatile manner. The manufacturing ID is unique to the microprocessor. The computer readable program code includes second program code for specifying a secret encryption key that is stored internally within the microprocessor and unreadable externally from the microprocessor. The computer readable program code includes third program code for specifying an AES encryption engine, coupled to receive the manufacturing ID and the secret encryption key, configured to encrypt the manufacturing ID using the secret encryption key to generate an unpredictable key that is unique to the microprocessor.

DETAILED DESCRIPTION OF THE INVENTION

Figure 1:
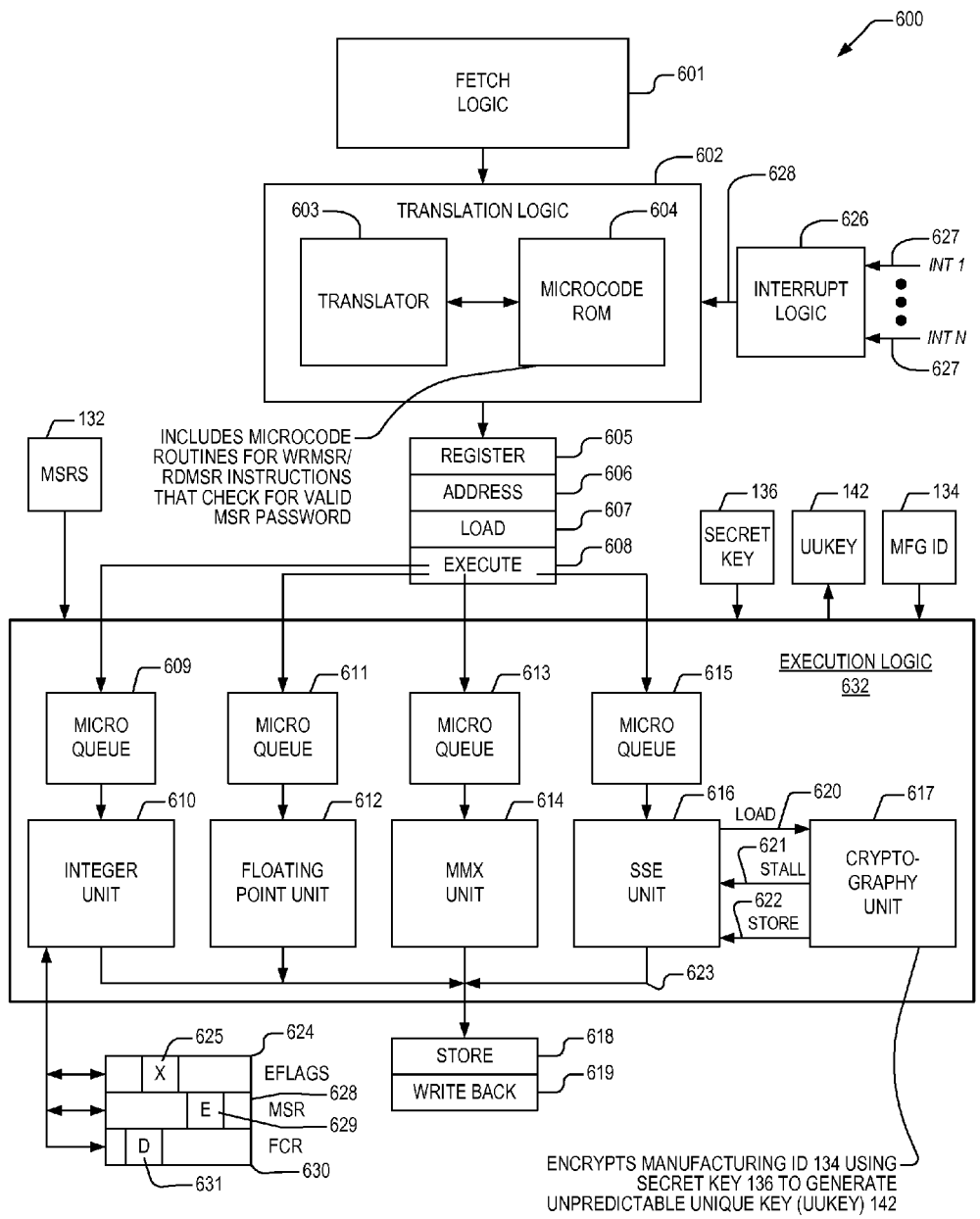
FIG. 1 is a block diagram illustrating a microprocessor according to one embodiment of the present invention.

Referring now to FIG. 1, a block diagram illustrating a microprocessor 100 according to one embodiment of the present invention is shown. Each individual microprocessor 100 part manufactured can generate a unique unpredictable key (uukey) 142 that is unique to that individual microprocessor 100, and is sufficiently unpredictable for use security purposes, for example as an encryption key. This is accomplished by AES-encrypting a user-visible, predictable processor-unique serial number, manufacturing ID 134, with a secret key 136 that is hidden within the microprocessor 100, i.e., it is not externally visible to anyone and is only known by a very small number of people. However, the microprocessor 100 internally (e.g., microcode within the microcode ROM 604) can access the secret key 136 to AES encrypt the predictable manufacturing ID 134 with the secret key 136 to produce the uukey 142. The uukey 142 may be used in various applications, such as a password for protected MSR 132 access, encryption/decryption of a microcode patch, or in software protection schemes that bond the use of software to a particular microprocessor 100 using the uukey 142.

Because the embodiments described herein use a secret key 136 that is not externally visible to encrypt the manufacturing ID 134 into the uukey 142, the encrypted uukey 142 is not only unique, but is unpredictable. In contrast, Lee, et al. acknowledges that his system does not provide complete protection against unauthorized access to the key or serial number, but only keeps the casual user from gaining unauthorized access.

Furthermore, unlike Lee, et al., the systems described herein do not require an NVRAM on the package with the CPU. Lee, et al. requires the NVRAM because he generates his doubly-encrypted CPU serial number at manufacturing time and must program it into some non-volatile memory because he needs to be able to change the CPU serial number in the event of a processor upgrade. In contrast, the embodiments described herein generate the uukey 142 during operation of the microprocessor 100 in the field each time it is needed by encrypting the manufacturing ID 134, which is non-volatile (e.g., programmed by blowing fuses at manufacturing time), with the secret key 136 within the microprocessor 100, that cannot be accessed externally.

Figure 2:
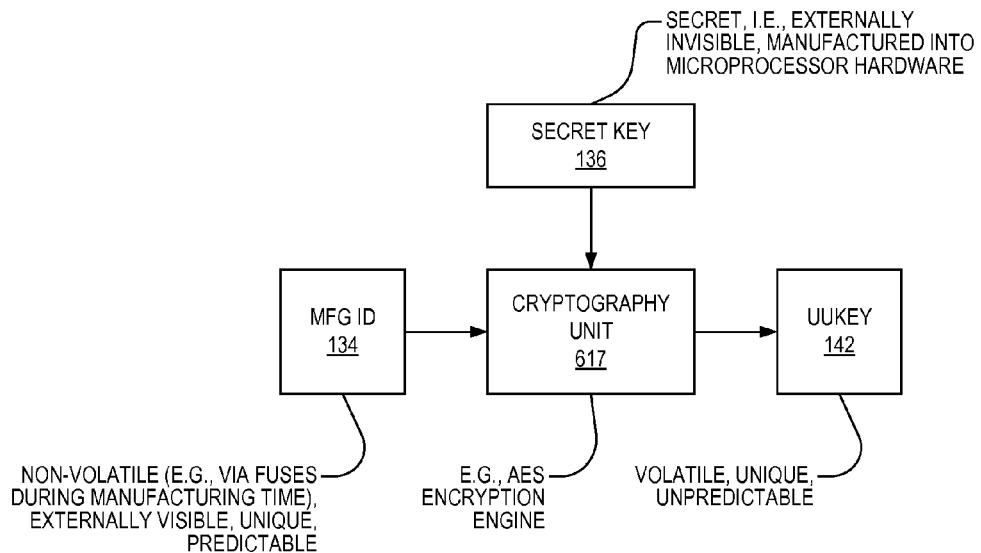
FIG. 2 is a block diagram illustrating operation of the microprocessor of FIG. 1.
Figure 3:
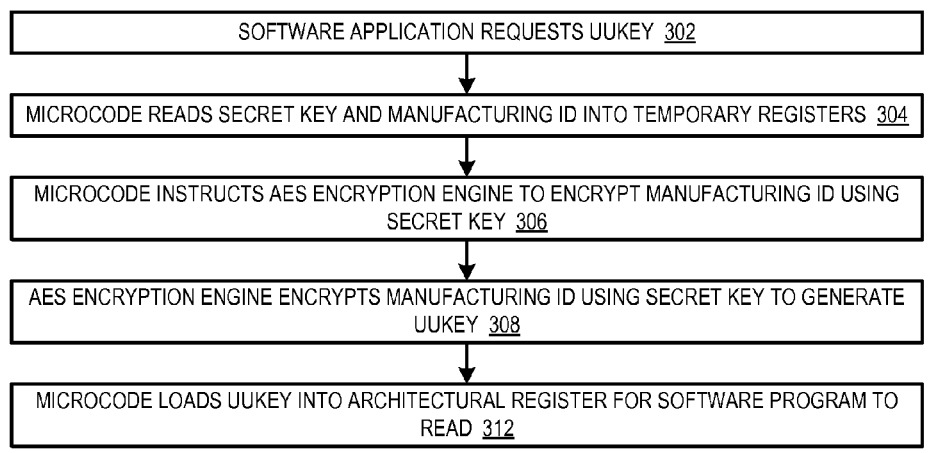
FIG. 3 is a flowchart illustrating operation of the microprocessor of FIG. 1.

The microprocessor 100 of FIG. 1 is similar to the microprocessor 600 described in detail in FIG. 6 of U.S. Pat. No. 7,321,910 (CNTR.2224). Additionally, the microprocessor 100 includes a manufacturing ID 134 and a secret key 136 that are coupled to the execution logic 632 for reception by the cryptography unit 617, which according to one embodiment includes an AES encryption engine capable of encrypting plain text into cipher text and decrypting cipher text into plain text using the secret key 136. The AES encryption engine of the cryptography unit 617 generates the uukey 142 that is unique to each individual microprocessor 100 by encrypting the unique but predictable manufacturing ID 134 using the secret (i.e., externally invisible) secret key 136, as illustrated in the block diagram of FIG. 2 and the flowchart of FIG. 3.

The manufacturing ID 134 is predictable in the sense that if an attacker knows the manufacturing ID 134 of one of the manufacturer's microprocessors 100, he can relatively easily predict the manufacturing ID 134 of another one of the manufacturer's microprocessors 100. This is because the manufacturing ID 134 is purposely highly structured, i.e., they are relatively sequential, so that they can be used for manufacturing-related purposes, such as identifying which batch a particular part came from in manufacturing for failure analysis purposes, for example. Furthermore, the number of possible manufacturing IDs 134 for the manufacturer's processors (on the order of tens or hundreds of millions) is relatively small in relation to the ability of computers to guess passwords or keys. Therefore, because the manufacturing ID 134 is highly predictable, it is not suitable for use as an encryption key. In contrast, the uukey 142 is unpredictable for at least two reasons. First, encrypting the manufacturing ID 134 causes the generated uukey 142 to be highly unpredictable, as long as the encryption algorithm used generates unpredictable values, such as AES encryption of 128-bit values with a secret 128-bit encryption key, according to one embodiment. AES encryption has the advantage that even if two of three items are known (manufacturing ID 134, secret key 136, and uukey 142), the third item cannot be calculated within a meaningful length of time by current or near future capabilities. Second, the uukey 142 is 128 bits, which creates a large enough number of possible values that it is essentially unpredictable by current computer capabilities.

The secret key 136 is hardwired within the microprocessor 100 and can be read by microcode of the microprocessor 100, but may not be read externally to the microprocessor 100. In one embodiment, the secret key 136 is the same for all instances of the manufacturer's microprocessors 100, thereby insuring that the generated uukey 142 is unique with respect to other of the manufacturer's microprocessors 100 since the manufacturing ID 134 is unique for all the manufacturer's microprocessors 100. In one embodiment, the secret key 136 is known only by a very small number of authorized people. In one embodiment, the secret key 136 is 128 bits. In one embodiment the manufacturing ID 134 is a 50-bit value that is padded with 78 additional bits (which are also secret according to one embodiment) before being encrypted by the AES encryption engine to generate the uukey 142. In one embodiment, the manufacturer blows the manufacturing ID 134 value 134 into fuses of the microprocessor 100 at manufacturing time. The manufacturing ID 134 is readable via MSRs 132. The manufacturing ID 134 is a predictable sequential number.

Generally speaking, the embodiments described herein may be used in essentially any application that requires an unpredictable key that is unique to each processor part, such as binding software to a particular processor part. Some specific applications for the uukey 142 include, but are not limited to, encrypting microcode patches and restricting access to MSRs.

In addition to the advantages stated above, the approach described herein may save fuses. Fuses within the microprocessor 100 could be used to store the uukey 142 in a non-volatile fashion, rather than generating it on an as-needed basis. However, in cases where the uukey 142 is used as an encryption key, a key that can provide robust security will take at least 128 fuses, which is more than double the number of fuses used for the manufacturing ID 134, according to one embodiment.

While various embodiments of the present invention have been described herein, it should be understood that they have been presented by way of example, and not limitation. It will be apparent to persons skilled in the relevant computer arts that various changes in form and detail can be made therein without departing from the scope of the invention. For example, software can enable, for example, the function, fabrication, modeling, simulation, description and/or testing of the apparatus and methods described herein. This can be accomplished through the use of general programming languages (e.g., C, C++), hardware description languages (HDL) including Verilog HDL, VHDL, and so on, or other available programs. Such software can be disposed in any known computer usable medium such as semiconductor, magnetic disk, or optical disc (e.g., CD-ROM, DVD-ROM, etc.). Embodiments of the apparatus and method described herein may be included in a semiconductor intellectual property core, such as a microprocessor core (e.g., embodied in HDL) and transformed to hardware in the production of integrated circuits. Additionally, the apparatus and methods described herein may be embodied as a combination of hardware and software. Thus, the present invention should not be limited by any of the exemplary embodiments described herein, but should be defined only in accordance with the following claims and their equivalents. Specifically, the present invention may be implemented within a microprocessor device which may be used in a general purpose computer. Finally, those skilled in the art should appreciate that they can readily use the disclosed conception and specific embodiments as a basis for designing or modifying other structures for carrying out the same purposes of the present invention without departing from the scope of the invention as defined by the appended claims.

We claim:

1. A microprocessor, comprising:
    a manufacturing ID, stored in the microprocessor during manufacture thereof in a non-volatile manner, wherein the manufacturing ID is unique to the microprocessor;
    a secret encryption key, stored internally within the microprocessor and unreadable externally from the microprocessor, wherein the secret encryption key is the same within each instantiation of the microprocessor of the same manufacturer; and
    an AES encryption engine, coupled to receive the manufacturing ID and the secret encryption key, configured to encrypt the manufacturing ID using the secret encryption key to generate an unpredictable key that is unique to the microprocessor.

2. The microprocessor of claim 1, wherein the unpredictable key is stored within the microprocessor only in a volatile fashion.

3. The microprocessor of claim 1, wherein the manufacturing ID is stored in the microprocessor during manufacture thereof in a non-volatile manner in fuses disposed within the microprocessor.

4. The microprocessor of claim 1, wherein the microprocessor is configured to generate the unpredictable key that is unique to the microprocessor in response to a request by a software application executing on the microprocessor.

5. The microprocessor of claim 1, further comprising:
    microcode, configured to instruct the AES encryption engine to encrypt the manufacturing ID using the secret encryption key to generate the unpredictable key that is unique to the microprocessor and to load the generated unpredictable key into an architectural register of the microprocessor.

6. The microprocessor of claim 1, wherein the secret encryption key is known only by the manufacturer of the microprocessor.

7. The microprocessor of claim 1, wherein the secret encryption key is readable only by microcode of the microprocessor.

8. The microprocessor of claim 1, wherein the secret encryption key is manufactured internally within the microprocessor.

9. The microprocessor of claim 1, wherein the secret encryption key is the only encryption key used by the AES encryption engine to encrypt the manufacturing ID to generate the unpredictable key that is unique to the microprocessor.

10. A method, comprising:
    storing a manufacturing ID in a microprocessor during manufacture thereof in a non-volatile manner, wherein the manufacturing ID is unique to the microprocessor;
    storing a secret encryption key internally within the microprocessor in a manner unreadable externally from the microprocessor, wherein the secret encryption key is the same within each instantiation of the microprocessor of the same manufacturer; and
    encrypting the manufacturing ID using the secret encryption key to generate an unpredictable key that is unique to the microprocessor, wherein said encrypting is performed by an AES encryption engine of the microprocessor.

11. The method of claim 10, further comprising:
    storing the unpredictable key within the microprocessor only in a volatile fashion.

12. The method of claim 10, wherein said storing the manufacturing ID in the microprocessor during manufacture thereof is performed in a non-volatile manner in fuses disposed within the microprocessor.

13. The method of claim 10, wherein the said encrypting the manufacturing ID using the secret encryption key to generate the unpredictable key that is unique to the microprocessor is performed in response to a request by a software application executing on the microprocessor.

14. The method of claim 10, further comprising:
    executing microcode within the microprocessor to instruct the AES encryption engine to encrypt the manufacturing ID using the secret encryption key to generate the unpredictable key that is unique to the microprocessor and to load the generated unpredictable key into an architectural register of the microprocessor.

15. The method of claim 10, wherein the secret encryption key is known only by the manufacturer of the microprocessor.

16. The method of claim 10, wherein the secret encryption key is readable only by microcode of the microprocessor.

17. The method of claim 10, wherein the secret encryption key is manufactured internally within the microprocessor.

18. The method of claim 10, wherein the secret encryption key is the only encryption key used by the AES encryption engine to encrypt the manufacturing ID to generate the unpredictable key that is unique to the microprocessor.

19. A computer program product for use with a computing device, the computer program product comprising:
    a non-transitory computer usable storage medium, having computer readable program code embodied in said medium, for specifying a microprocessor, the computer readable program code comprising:
        first program code for specifying a manufacturing ID, stored in the microprocessor during manufacture thereof in a non-volatile manner, wherein the manufacturing ID is unique to the microprocessor;

second program code for specifying a secret encryption key, stored internally within the microprocessor and unreadable externally from the microprocessor, wherein the secret encryption key is the same within each instantiation of the microprocessor of the same manufacturer; and third program code for specifying an AES encryption engine, coupled to receive the manufacturing ID and the secret encryption key, configured to encrypt the manufacturing ID using the secret encryption key to generate an unpredictable key that is unique to the microprocessor.

* * * * *